D. H. LEA.
TOOL FOR UNCAPPING HONEY AND LIKE PURPOSES.
APPLICATION FILED SEPT. 28, 1912.
1,104,053.
Patented July 21, 1914.
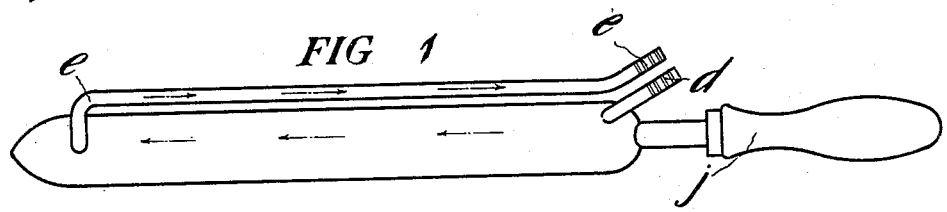
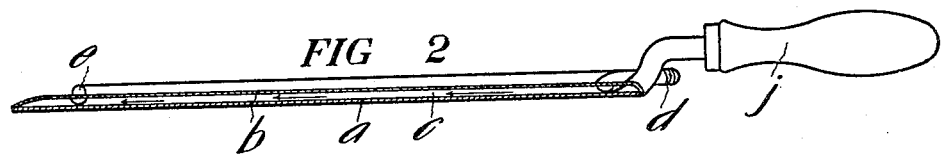
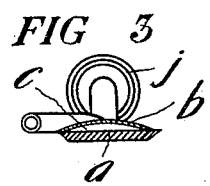
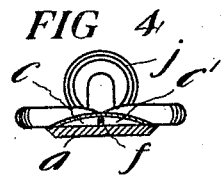
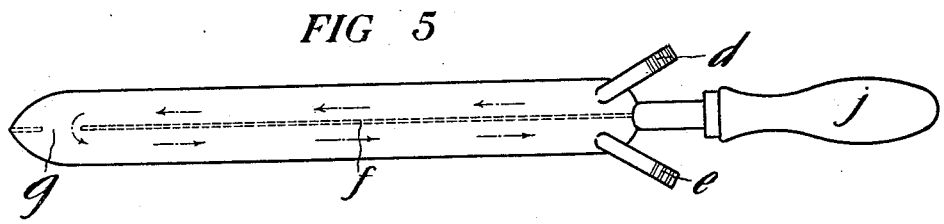
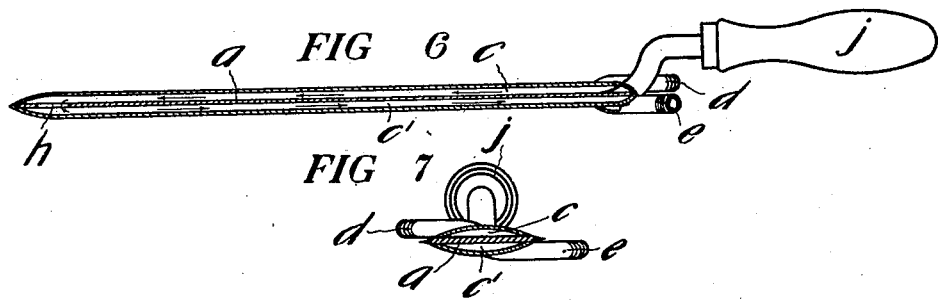
WITNESSES
INVENTOR
DONALD H. LEA
BY
ATTORNEY
THE NORRIS PETERS CO., WASHINGTON, D. C.

UNITED STATES PATENT OFFICE.

DONALD HENRY LEA, OF WESTMERE POST OFFICE, NEAR WANGANUI, NEW ZEALAND.

TOOL FOR UNCAPPING HONEY AND LIKE PURPOSES.

1,104,053. Specification of Letters Patent. Patented July 21, 1914.

Application filed September 28, 1912. Serial No. 722,923.

*To all whom it may concern:*

Be it known that I, DONALD HENRY LEA, a citizen of New Zealand, residing at Westmere Post Office, near Wanganui, New Zealand, have invented new and useful Improvements Relating to Tools for Uncapping Honey and like Purposes; and I do hereby declare the following to be a full, clear, and exact description of the same.

In the production of honey it is necessary to remove the wax covering from the combs so that the honey may be extracted from the comb and placed in jars or bottles for marketing or storing. This operation of removing the comb is generally termed uncapping and is usually performed by means of a double edged knife which has been heated by placing it in hot water. This method of heating the knife is unsatisfactory as the temperature of the knife varies during the operation of cutting and considerable time is also taken in heating the knife.

The present invention relates to knives for performing this uncapping operation and seeks to provide a knife or other utensil for this purpose having means around or upon the blade or around or upon the tang part for supplying heat to the blade and for maintaining it at a constant and uniform temperature during the cutting operation.

On the drawings: Figure 1 is a plan view of a knife showing one means of maintaining the temperature of the blade. Fig. 2 is a longitudinal section of Fig. 1. Fig. 3 is a transverse section of the knife blade shown in Figs. 1 and 2. Fig. 4 is a transverse section of Fig. 5. Fig. 5 is a plan view of a modified form of knife. Fig. 6 is a longitudinal section of a further modification. Fig. 7 is a transverse section of Fig. 6.

In Figs. 1 to 5 of these drawings the knife blade $a$ is provided with a thin sheet metal jacket $b$ on its upper side, the edges of this jacket being suitably connected to the knife blade $a$ in such a manner as to form a steam and watertight joint between the said edges and the knife blade $a$ and forming a chamber $c$. Into the chamber $c$ formed between the knife blade and the jacket a heated medium is introduced at a suitable point by means of a short inlet tube $d$ integral with or connected to the jacket $b$ and to this tube $d$ is attached a flexible pipe conducting the heated medium (which may be either steam, heated fluid or gas) from a small boiler or suitable generator. The heated medium then passes along between the knife blade $a$ and the jacket $b$ and in the form shown at Figs. 1 and 2 escapes at the point of the knife through a small outlet tube $e$ connected to the jacket. The outlet tube $e$ is preferably carried externally to the handle end of the knife where it terminates at a point near the inlet tube, as shown in Fig. 1. A flexible tube may be attached to the outlet tube for the purpose of carrying away the steam, heated fluid or gas to a suitable receptacle or returning it to the boiler or generator.

In Figs. 4 and 5 I have illustrated a modified form of my invention in which instead of carrying the outlet tube $e$ externally from the point of the knife to the handle I divide the jacket space into two chambers or compartments $c$ and $c^1$ by a longitudinal division plate, or diaphragm $f$, the two parts being in communication at the point of the knife through an opening $g$, Fig. 5, in the diaphragm. The inlet and outlet tubes $d$ and $e$ respectively lead into each compartment and are preferably situated near the knife handle $j$. In this case the heated medium enters through the inlet tube $d$ and passes along the compartment $c$ of the jacket toward the joint of the knife; it then passes through the opening $g$ and returns along the other compartment $c^1$ to the outlet tube $e$.

In the further construction shown at Figs. 6 and 7 the knife $a$ preferably has a thin blade and has a jacket formed upon each side of the blade. It will be seen that in all examples the jacket or the blade is so contrived that there is always an effective cutting edge at one or both sides. It is preferred that the steel or other suitable knife blade itself projects to form this cutting edge or edges. The two jackets $c$ and $c^1$ are in communication with one another by means of a hole $h$ in the point of the blade $a$. The inlet tube $d$ leads into the jacket $c$ and the outlet tube $e$ leads from the jacket or compartment $c^1$. The heated medium preferably enters near the handle $j$ and passes along one side of the blade toward the point and then returns along the other side of the blade toward the handle J, where it leaves by the outlet tube $e$.

It will be understood that I do not wish to restrict myself to the particular construction illustrated upon the accompanying drawings as these constructions may be considerably varied without departing from my invention.

What I claim and desire to secure by Letters Patent then is:—

1. A tool for uncapping honey or for like purposes, comprising a thin flat hard metal knife blade having a cutting edge; a sheet metal jacket secured at its edges to said blade thereby forming a chamber upon said blade but leaving said cutting edge projecting, and means for conducting a heating medium into and out of said chamber.

2. A tool for uncapping honey or for like purposes, comprising a flat hard steel blade having cutting edges and an intra-marginal portion all of constant thickness, the marginal portions being of less thickness than and lying in the same plane with the intra-marginal portion; a separate curved sheet metal jacket secured at its edges to said blade but leaving said marginal portion projecting and forming a chamber; and means for conducting a heating medium through the chamber.

3. A tool for uncapping honey or for like purposes, comprising a thin flat blade having cutting edges; a handle rigidly secured to said blade; a sheet metal jacket secured at its edges to the upper side of said blade, forming thereby a chamber; an inlet tube adjacent to said handle and communicating with the chamber; outlet tube leading from said chamber near the point of the blade and disposed away from and in spaced relation to said jacket and extending to near the handle; and flexible connections secured to the tubes respectively.

In testimony whereof I affix my signature in presence of two witnesses.

DONALD HENRY LEA.

Witnesses:
FLORENCE LOMAX,
H. ERLIO UNDRALO.

Copies of this patent may be obtained for five cents each, by addressing the "Commissioner of Patents, Washington, D. C."